(12) United States Patent
Beaupre

(10) Patent No.: US 10,500,762 B2
(45) Date of Patent: Dec. 10, 2019

(54) SYSTEM AND METHOD FOR DETERMINING A STATUS OF A VALVE USING AN ACTUATOR ACCELEROMETER AND A REFERENCE ACCELEROMETER

(71) Applicant: COMMAND ALKON DUTCH TECH B.V., Birmingham, AL (US)

(72) Inventor: Denis Beaupre, Sainte-Catherine-de-la-Jacques-Cartier (CA)

(73) Assignee: COMMAND ALKON INCORPORATED, Birmingham, AL (US)

( * ) Notice: Subject to any disclaimer, the term of this patent is extended or adjusted under 35 U.S.C. 154(b) by 256 days.

(21) Appl. No.: 15/448,094

(22) Filed: Mar. 2, 2017

(65) Prior Publication Data

US 2017/0173822 A1 Jun. 22, 2017

Related U.S. Application Data

(63) Continuation of application No. PCT/CA2015/050838, filed on Sep. 1, 2015.
(Continued)

(51) Int. Cl.
*B28C 7/04* (2006.01)
*B28C 7/12* (2006.01)
(Continued)

(52) U.S. Cl.
CPC ............ *B28C 7/0418* (2013.01); *B28C 5/422* (2013.01); *B28C 5/4231* (2013.01); *B28C 7/128* (2013.01); *F16K 37/0041* (2013.01); *B60P 3/16* (2013.01)

(58) Field of Classification Search
CPC ..... B28C 7/0418; B28C 5/422; B28C 5/4231; B28C 7/128; B28C 7/02; F16K 37/0041;
(Continued)

(56) References Cited

U.S. PATENT DOCUMENTS

| 5,431,182 A | 7/1995 | Brown | |
| 5,884,475 A * | 3/1999 | Hofmann | B01D 53/9431 60/274 |

(Continued)

FOREIGN PATENT DOCUMENTS

| CN | 204284634 U | 4/2015 |
| DE | 10219171 A1 | 11/2003 |

(Continued)

OTHER PUBLICATIONS

Keg. Wikipedia, The Free Encyclopedia. 7 pages. Aug. 29, 2014 (Year: 2014).*

*Primary Examiner* — Robert E Fennema
*Assistant Examiner* — Marzia T Monty
(74) *Attorney, Agent, or Firm* — Norton Rose Fulbright Canda LLP; Alexandre Daoust

(57) ABSTRACT

The system for determining a status of a valve being mounted in a liquid supply line of a concrete mixer and being actuatable via an actuator generally has: an actuator accelerometer mounted to the actuator and being adapted to measure an actuator position associated with a position of the valve; a reference accelerometer mounted to the concrete mixer and being adapted to measure a reference position fixed relative to the concrete mixer, the actuator position and the reference position being measured while the concrete mixer is fixed relative to the ground; a computing device adapted to receive the actuator and reference positions, the computing device being adapted to determine the status of the valve based on the actuator position, the reference
(Continued)

position and calibration position data; and to generate status of the valve indicative of the determined status of the valve.

21 Claims, 5 Drawing Sheets

Related U.S. Application Data

(60) Provisional application No. 62/046,227, filed on Sep. 5, 2014.

(51) Int. Cl.
*B28C 5/42* (2006.01)
*F16K 37/00* (2006.01)
*B60P 3/16* (2006.01)

(58) Field of Classification Search
CPC ........ B60P 3/16; G01F 15/022; G01F 15/005; G01F 15/001
See application file for complete search history.

(56) References Cited

U.S. PATENT DOCUMENTS

| | | | |
|---|---|---|---|
| 9,151,022 B2 | 10/2015 | Patel et al. | |
| 9,354,640 B2 | 5/2016 | Byler | |
| 2006/0150932 A1 | 7/2006 | Naber et al. | |
| 2008/0071424 A1* | 3/2008 | St. Jean | G01F 13/006 700/282 |
| 2008/0237516 A1 | 10/2008 | Hansson | |
| 2008/0316856 A1* | 12/2008 | Cooley | B28C 5/422 366/142 |
| 2011/0083746 A1 | 4/2011 | Hoang | |
| 2011/0161051 A1 | 5/2011 | Vander Linden et al. | |
| 2011/0205055 A1 | 8/2011 | Smaidris et al. | |
| 2013/0036815 A1* | 2/2013 | Bernhardsgruetter | A47J 31/4457 73/290 V |
| 2013/0181829 A1* | 7/2013 | Schnitz | G06Q 10/08 340/539.1 |
| 2013/0306029 A1* | 11/2013 | Stockner | F02M 21/0245 123/445 |
| 2013/0314239 A1 | 11/2013 | Clark et al. | |
| 2014/0005960 A1 | 1/2014 | Anderson et al. | |
| 2014/0151589 A1 | 6/2014 | Cox et al. | |
| 2014/0216708 A1* | 8/2014 | Hamm | F28F 27/00 165/281 |
| 2014/0225741 A2 | 8/2014 | Gritzo et al. | |
| 2014/0238512 A1 | 8/2014 | Bowers | |
| 2014/0251590 A1* | 9/2014 | Iveson | F16J 15/162 165/287 |
| 2014/0265169 A1 | 9/2014 | Giovanardi et al. | |
| 2015/0149100 A1 | 5/2015 | Eisenbeis et al. | |
| 2015/0204458 A1 | 7/2015 | Taitt et al. | |
| 2015/0260310 A1 | 9/2015 | Bahalul | |
| 2016/0208952 A1 | 7/2016 | Howitt | |

FOREIGN PATENT DOCUMENTS

| | | |
|---|---|---|
| WO | 2014130919 A1 | 8/2014 |
| WO | 2016016650 A1 | 2/2016 |
| WO | 2016175800 A1 | 11/2016 |
| WO | 2017005929 A2 | 1/2017 |

\* cited by examiner

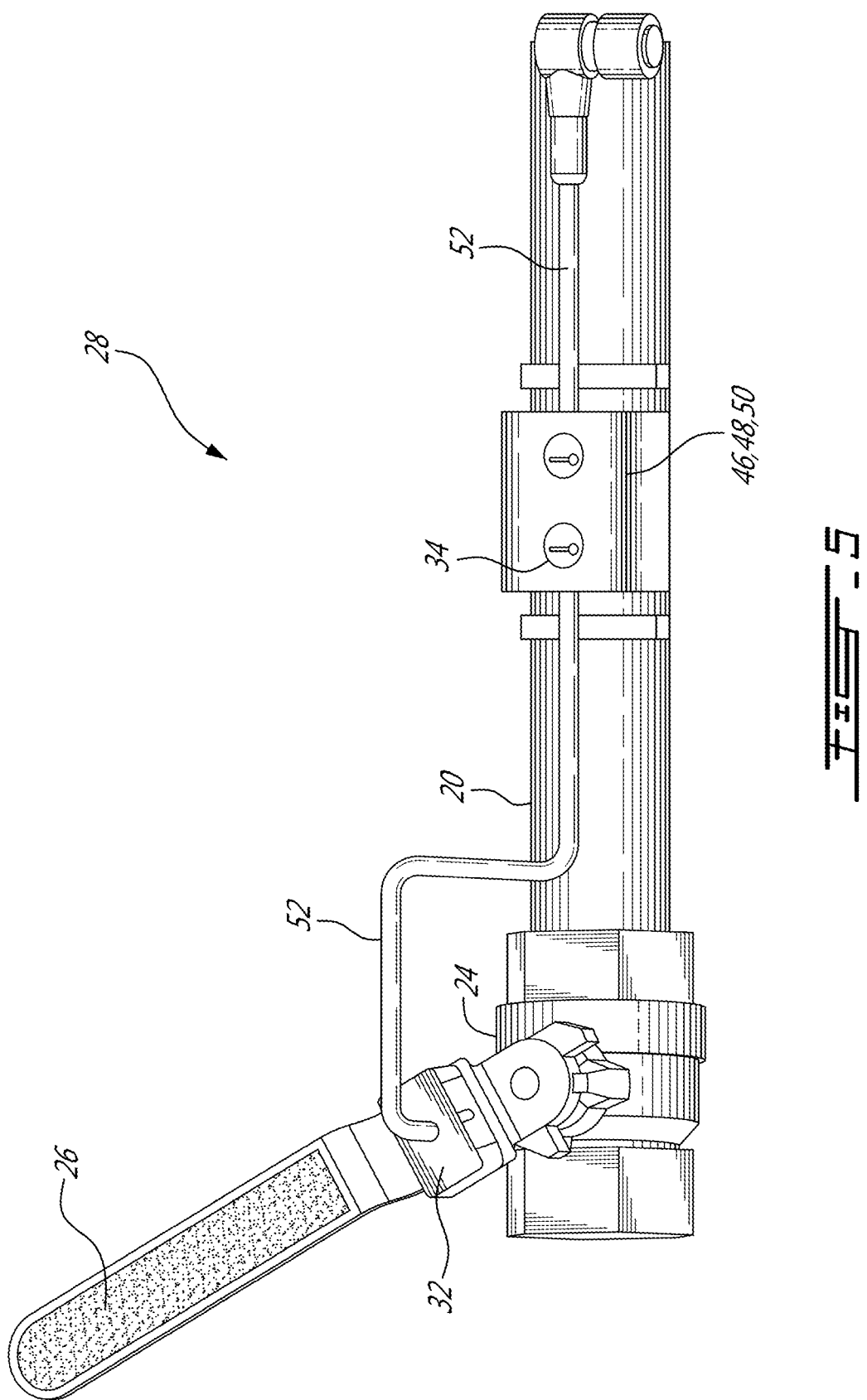

SYSTEM AND METHOD FOR DETERMINING A STATUS OF A VALVE USING AN ACTUATOR ACCELEROMETER AND A REFERENCE ACCELEROMETER

BACKGROUND

In many applications, monitoring an amount of water distributed from a water supply line is required. For instance, during preparation of ready-mix concrete, water is often added to the ready-mix concrete in order to adjust the workability thereof. However, adding too much water, or not enough, can cause challenges in achieving and/or maintaining a satisfactory workability of the ready-mix concrete. Monitoring the amount of water added to the ready-mix concrete can therefore be a concern.

The amount of water delivered from the water supply line is generally measured and/or monitored using a flow meter mounted inside the water supply line and in direct contact with water. Although the use of the flow meter can help monitoring the amount of water, wear of the latter and costs associated with its replacement are more than often inconvenient. Furthermore, in climates where temperature often drops below the freezing point, water remaining in the water supply line which lies on the flow meter can freeze and thus cause the flow meter to break.

There thus remained room for improvement, particularly in terms of providing an alternative for the flow meter which avoids direct contact with water.

SUMMARY

Therefore, there is provided a system allowing monitoring an amount of water being delivered from a liquid supply line which avoids direct contact with water. In these applications, water is usually being delivered from the liquid supply line via actuation of a valve being actuatable by an actuator. The latter controls a status including a degree of opening of the valve and hence, a flow rate of the liquid being delivered thereby. By mounting an actuator accelerometer to the actuator and a reference accelerometer to the liquid supply line, determining the status, the degree of opening of the valve and determining a volume of water being delivered can be performed using a computing device having access to calibration position data and calibration flow data.

In accordance with one aspect, there is provided a system for determining a status of a valve being mounted in a liquid supply line of a concrete mixer, the concrete mixer having a drum rotatable about an axis and a liquid reservoir connected to the drum via the liquid supply line, the valve being actuatable from a first position to a second position, the system comprising: an actuator accelerometer mounted to the actuator and being adapted to measure an actuator position associated with the second position of the valve; a reference accelerometer mounted to the concrete mixer and being adapted to measure a reference position fixed relative to the concrete mixer, the actuator position and the reference position being measured while maintaining the concrete mixer in a fixed orientation relative to a ground reference; a computing device operatively connected to the actuator and reference accelerometers for receiving both the actuator and reference positions, the computing device being adapted to perform the steps of determining the status of the valve based on the actuator position, the reference position and calibration position data; and generating status data indicative of the determined status of the valve.

In accordance with another aspect, there is provided a method for determining a status of a valve connected to a liquid supply line and controllable via an actuator, the method comprising the steps of: actuating the valve from a first position to a second position via the actuator; while maintaining the liquid supply line in a fixed orientation relative to a ground reference, measuring both an actuator position associated to the second position of the valve and a reference position fixed relative to the liquid supply line; determining the status of the valve based on the actuator position, the reference position and calibration position data; and generating status data indicative of the determined degree of opening of the valve.

Many further features and combinations thereof concerning the present improvements will appear to those skilled in the art following a reading of the instant disclosure.

DESCRIPTION OF THE FIGURES

In the figures,

FIG. 5 is a schematic view of a third example of a device for determining a status of a valve.

DETAILED DESCRIPTION

Figure 1:
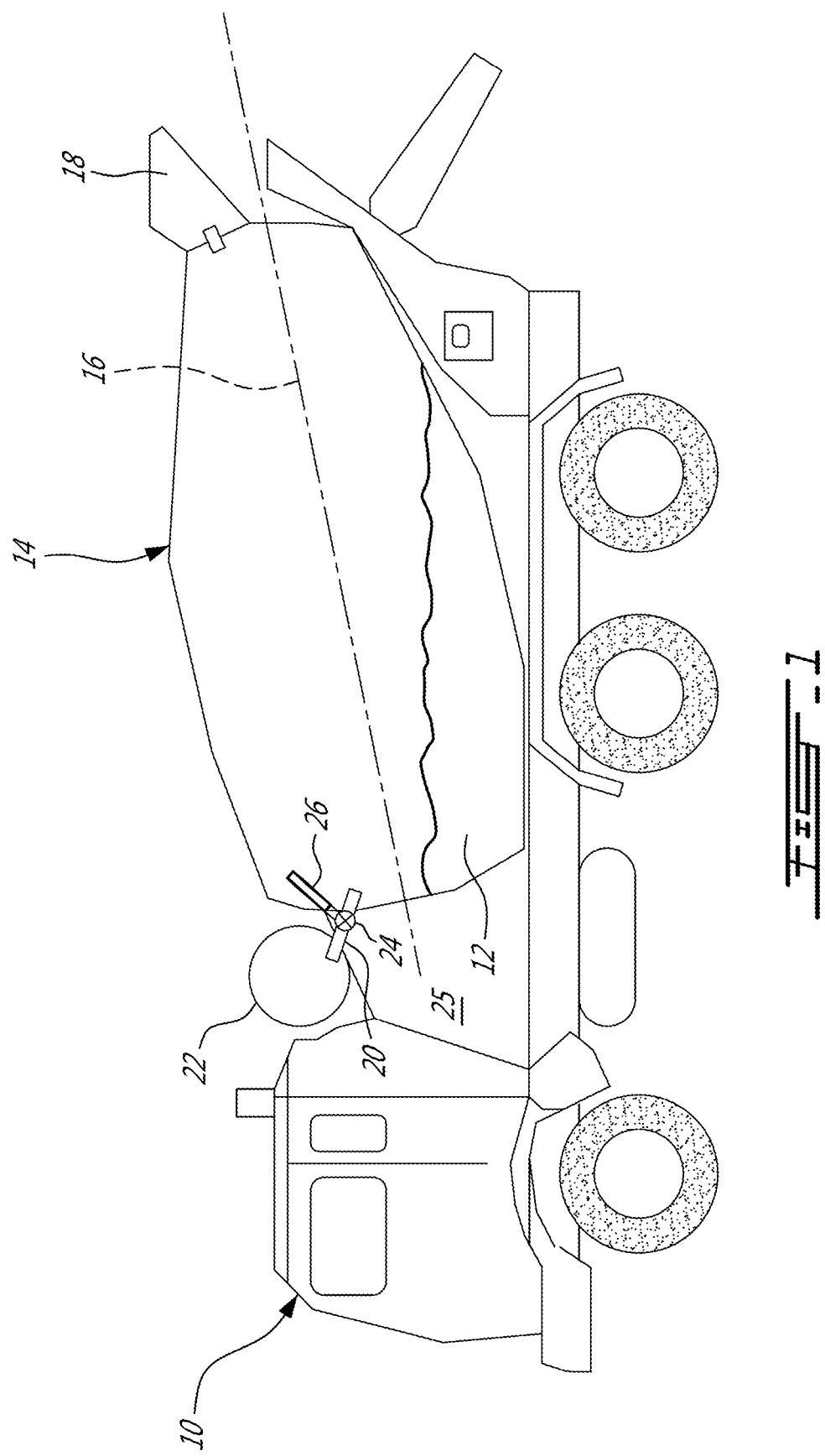
FIG. 1 is a view of an example of a concrete mixer.

FIG. 1 shows an exemplary application in which the system and methods disclosed herein can be appropriate. In this exemplary application, a concrete mixer 10 can be used to prepare and transport ready-mix concrete 12 from a construction site to another. The concrete mixer 10 generally has a drum 14 rotatable about an axis 16 which allows for mixing of the ready-mix concrete 12. As mentioned above, adding substances (e.g., water, aggregates, admixtures) to the ready-mix concrete 12 on the run is often necessary for achieving/maintaining a satisfactory workability thereof. Aggregates, admixtures and/or other substances can be added to the ready-mix concrete 12 of the drum 14 via a hopper 18, while water can be added to the ready-mix concrete of the drum via a liquid supply line 20 operatively connected to a liquid reservoir 22 (e.g., water reservoir).

As water can affect the workability of the concrete and have an impact on the compressive strength of the ready-mix concrete as it is cured, for instance, it is important to suitably control the volume of water added to the ready-mix concrete. Accordingly, a valve 24 is operatively mounted in the liquid supply line 20 for controlling a flow of water that is to be added to the ready-mix concrete 12. The valve 24 can be provided in the form of a ball valve, a gate valve, a manual valve, a butterfly valve and any other suitable valve. In this example, the valve 24 has an actuator 26 provided in the form of a lever. However, in other embodiments, the actuator 26 is provided in the form of a handle, a hand wheel, a shaft controlled by a motor or any other suitable type of actuator.

More specifically, the liquid reservoir 22 is in a fixed relative position relative to a body 25 of the concrete mixer truck 10, and to the axis 16, whereas the drum rotates around the axis and is thus rotatable relative to the reference frame of the body 25 of the concrete mixer truck 10. Similarly, the actuator 26 is movable (and more specifically pivotable in this embodiment, relative to the reference frame of the body 25 of the concrete mixer truck 10.

Figure 2:
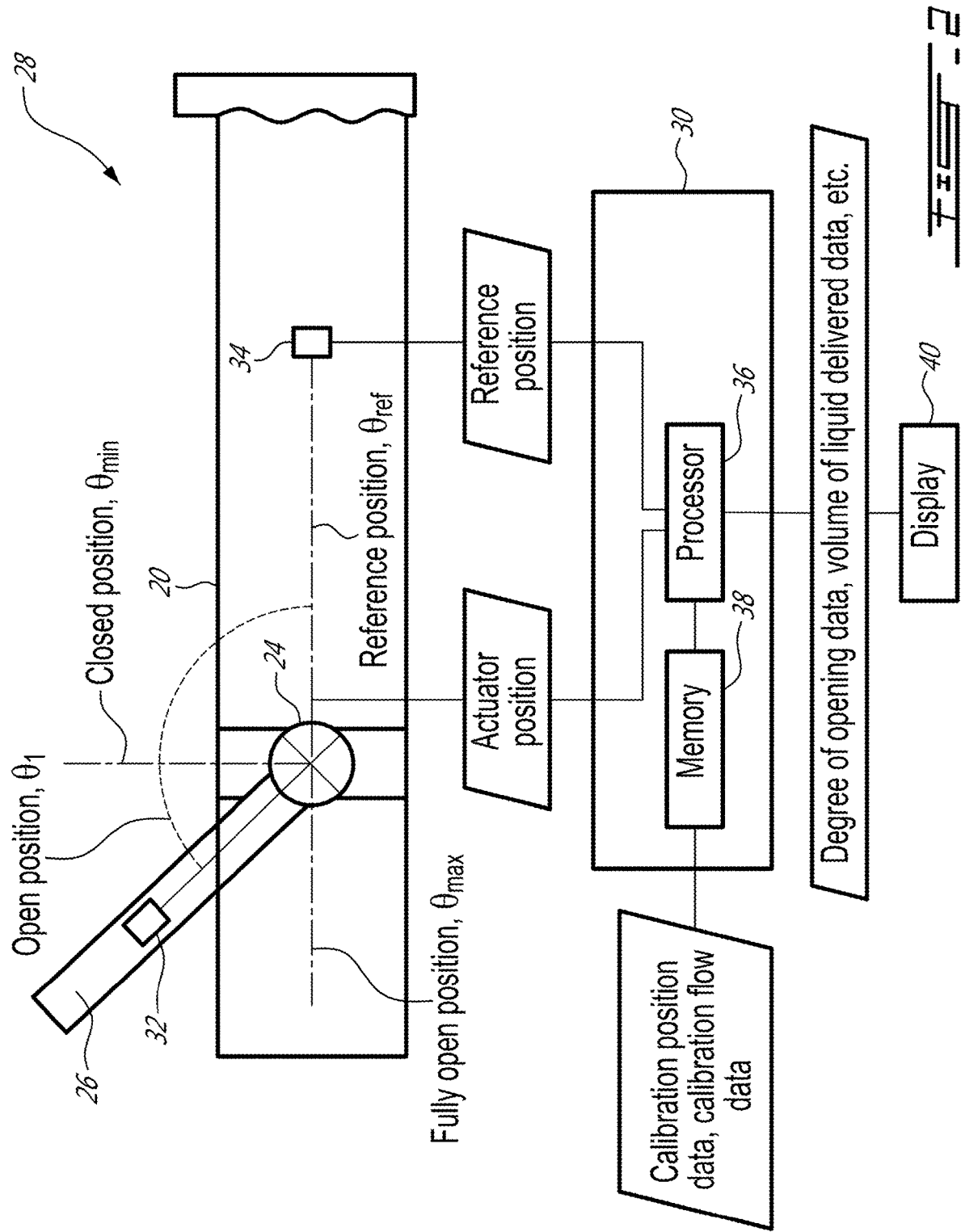
FIG. 2 is a schematic view of a first example of a device for determining a status of a valve.

FIG. 2 shows a schematic view of a first example of a system 28 for determining a status of the valve 24 mounted to the liquid supply line 20, wherein the status includes a degree of opening of the valve. The system 28 can also be used to determine a flow of water being delivered by the valve 24 and moreover, a volume of water being delivered as a function of time based on the degree of opening of the valve 24. The status of the valve can be indicative that the valve is opened, closed or opened at a particular degree of opening. In order to determine the status, position of the actuator 26 relative to the liquid supply line 20 (or relative to the concrete mixer) is monitored over time and compared to calibration data using a computing device 30. To do so, an actuator sensor 32 is mounted on the actuator 26 for measuring a sensor position. However, using only the actuator sensor 32 can cause challenges. Indeed, in application where the liquid supply line 20 has an orientation fixed relative to a ground reference, only the actuator sensor 32 is needed. This is not the case in applications where the liquid supply line 20 has an orientation which is not constant relative to a ground reference. Indeed, in the example of the concrete mixer 10, the latter can be in movement at any time and thus, its orientation relative to a ground reference can change. To circumvent the fact that the system may be mobile, a reference sensor 34 is mounted on the liquid supply line 20 (or directly to the concrete mixer 10) for compensating for potential movements of the concrete mixer 10. The actuator position and the reference position are measured over time while the liquid supply line 20 (or the concrete mixer 10) has an orientation fixed relative to a ground reference. In this situation, the actuator position and the reference position can be measured either sequentially or simultaneously. In the event where the concrete mixer 10 is moving however, the latter can have an orientation which is not fixed relative to a ground reference and therefore, the actuator position and the reference position are measured simultaneously (or quasi-simultaneously).

In order to monitor a volume of water being delivered by the liquid supply line 20 as a function of time based on the actuator position and on the reference position, calibration data are useful. The calibration data can include at least calibration position data and calibration flow data. The calibration position data are used to determine the status and thus the degree of opening of the valve 24 using the actuator and the reference positions while the calibration flow data are used to determine a flow of water based on the degree of opening of the valve 24. Both the calibration position data and the calibration flow data can be measured prior to the use of the system 28 and be stored for later use by the computing device 30. In other words, a technician can calibrate position measurements of the actuator sensor 32 and the reference sensor 34 based on a particular type of valve and/or actuator in order to obtain the calibration position data. Then, he/she can measure a flow of water associated to each of the possible position measurements of the actuator sensor 32 and the reference sensor 34 to obtain the calibration flow data. Finally, the calibration position data and the calibration flow data are stored on a memory which is to be accessible by the computing device 30. Later, in the field for instance, the computing device 30 can use the actuator position of the actuator sensor 32 and the reference position of the reference sensor 34 concurrently with the calibration data to determine the status of the valve 24, the flow of water being delivered by the liquid supply line 20 and the volume of liquid being delivered as a function of time. It is contemplated that although the calibration position data and the calibration flow data are being presented as being separate from one another, the calibration position data and the calibration flow data can be integrated to provide the flow of water based directly on the actuator position of the actuator 26 relative to the reference position of the reference sensor 34.

In this embodiment, the actuator sensor 32 and the reference sensor 34 are any type of sensors which can suitably measure position over time. In the example of FIG. 2, for instance, the actuator sensor 32 and the reference sensor 34 are each provided in the form of an accelerometer. The actuator and reference accelerometers 32, 34 are adapted to measure a magnitude and a direction of a two-dimensional (2D) or a three-dimensional (3D) acceleration which can be used to obtain a position, an orientation of the movement, vibration, shock, noise and damping as a function of time, for instance. The actuator and reference accelerometers 32, 34 are mounted on the exterior of, respectively, the actuator 26 and the liquid supply line 20 in order to avoid direct contact with water, and the drawbacks associated thereto. The accelerometers 32, 34 are hermetically isolated from air and water which can cause damage to them in the event of weather hazards. The actuator position of the actuator accelerometer 32 depends on the type of actuator 26 and on its geometry. Indeed, if the actuator 26 is provided in the form of a lever (see FIG. 2), then the angular position of the actuator 26 is sufficient for determining the status and the degree of opening of the valve 24. However, in an embodiment where the actuator 26 is provided in the form of a hand wheel (not shown), then the angular position of the actuator 26 might not be sufficient for determining the degree of opening of the valve 24. In this embodiment, the angular position of the actuator accelerometer 32 combined with an axial position (relative to a shaft of the handle wheel) are needed to suitably determine the degree of opening of the valve 24. It is readily understood that associating the actuator position and the reference position of depends on the type of actuator 26 and that doing so amounts to routine work for a person skilled in the art.

In this embodiment, the system 28 has a computing device 30 operatively connected to the actuator and reference accelerometers 32, 34. The computing device 30 may comprise one or more data processors 36 (referred hereinafter as "processor 36") and one or more associated memories 38 (referred hereinafter as "memory 38"). The computing device 30 may comprise one or more digital computer(s) or other data processors and related accessories. The processor 36 may include suitably programmed or programmable logic circuits. The memory 38 may comprise any storage means (e.g. devices) suitable for retrievably storing machine-readable instructions executable by the processor 36. The memory 38 may comprise non-transitory computer readable medium. For example, the memory 38 may include erasable programmable read only memory (EEPROM) and/or flash memory. The memory 38 may comprise, for example, but is not limited to, an electronic, magnetic, optical, electromagnetic, infrared, or semiconductor system, apparatus or device. Such machine-readable instructions stored in the memory 38 may cause the processor 36 to execute functions associated with various methods disclosed herein or part(s) thereof. The execution of such methods may result in the computing device 30 producing output such as status data including degree of opening data and volume of liquid delivered data, for instance. The computing device 30 can be mounted on the concrete mixer 10 or can be mounted elsewhere. For instance, the output can be transmitted to an external computing device located at a remote location and which can process the measured positions and then transmit back an output signal usable for determining the status of the valve 24 and/or the volume of water delivered. In other words, the sensors 32, 34 may communicate, respectively, the actuator position and the reference position in a wireless manner such as radio transmission and Bluetooth™. In this case, the computing device 30 is adapted to communicate (via radio transmission and/or Bluetooth™) with the sensors 32,34 for receiving the actuator and reference positions in order to compute the output. The output may comprise data representative of one or more characteristics of the ready-mix concrete. The computing device 30 receives data indicative of the actuator position and the reference position from, respectively, the actuator accelerometer 32 and the reference accelerometer 34 and can determine the output in accordance with the system and method disclosed herein. In this embodiment, the memory 38 have stored therein the calibration data including the calibration position data and the calibration flow data. The memory 38 can be permanently connected to the processor 36 of the computing device 30 or can alternatively be removably connected thereto via a portable storage media such as a USB memory key, for instance.

In the embodiment of FIG. 2, the system 28 further has a display 40 operatively connected to the computing device 30. The display 40 is adapted to display any of the output processed by the computing device 30. More specifically, the display 40 is adapted to display the volume of water being delivered to the ready-mix concrete 12 of the drum 14 in real time. Accordingly, a skilled technician can move the actuator 26 from the closed position to an open position and monitor the volume of water being delivered in real time. Once a threshold of the volume of water has been reached, the computing device 30 can cause the display 40 to prompt an alert the skilled technician, in turn, causing him/her to move the actuator 26 back to the closed position to prevent adding too much (or too less) water to the ready-mix concrete.

The calibration position data accessible by the computing device 30 to use the actuator and reference positions in order to obtain the status of the valve 24 can be obtained using various methods, depending on the type of actuator 26. In the exemplary embodiment of FIG. 2, the calibration position data can be obtained by measuring the actuator position of the actuator sensor 32 relative to the reference position of the reference sensor 34 for each possible positions of the lever 26. The possible positions of the lever 26 include a closed position $\theta_{min}$, a plurality of partially open positions $\theta$, and a fully open position $\theta_{max}$, wherein the positions are referred to a reference position $\theta_r$, for instance. During use of the system 28, the computing device 30 can use the calibration position data to associate the positions of the actuator 26 relative to the liquid supply line 20 in order to determine the degree of opening of the valve 24. In other embodiments, the method for producing calibration position data can include the steps of positioning the actuator 26 at a plurality of positions between a first position $\theta_1$ and a second position $\theta_2$; for each of the plurality of positions of the actuator 26, comparing the actuator position relative to the reference position; and producing the calibration position data based on the plurality of comparisons.

In an embodiment where the actuator 26 is a lever, for instance, the calibration position data may not be stored in calibration position data but rather computed in real time. Indeed, the degree of opening of the valve is computed according to equation (1) herebelow:

$$\text{Degree of opening} = (\theta_i - \theta_{min})/(\theta_{max} - \theta_{min}). \quad (1)$$

The calibration flow data accessible by the computing device 30 to use the degree of opening of the valve 24 in order to obtain a flow of water can be obtained in various methods. For instance, in the exemplary embodiment of FIG. 2, the actuator 26 is a lever which causes the valve to be closed (flow of water is null) when the lever 26 is at the closed position $\theta_{min}$. When the lever 26 is at the fully open position $\theta_{max}$, the flow of water is considered to be maximum. Between the closed position $\theta_{min}$ and the fully open position $\theta_{max}$ exists the plurality of partially open positions $\theta_i$ which can each be associated with a corresponding flow of water. Henceforth, the calibration flow data can be obtained by measuring a flow of water associated to each of the partially open position $\theta_i$ and to the fully open position $\theta_{max}$. When such measurements are performed, the calibration flow data can be used as a look-up table or a calibration chart by the computing device 30 to suitably associate the status of the valve 24 to the flow of water. In other embodiments, the method for producing calibration flow data can include the steps of positioning the actuator 26 at a plurality of positions between the first position $\theta_1$ and the second position $\theta_2$ thus allowing the liquid to flow from the liquid supply line 20 at a corresponding plurality of flow rates; for each of the plurality of positions of the actuator 26, measuring a flow rate value of the liquid through the valve 24 of the liquid supply line 20; associating each measured flow rates of the liquid with a corresponding one of the plurality of positions of the actuator 26; and producing the calibration flow data based on said associations. For instance, an example of a calibration flow data is provided herebelow at Table 1.

TABLE 1

Example of calibration flow data showing flow of water as a function of the position of the actuator

| Degree of opening of the valve (%) | Flow of water (%) |
| --- | --- |
| 0 | 0 |
| 20 | 3 |
| 40 | 10 |
| 60 | 22 |
| 70 | 34 |
| 80 | 51 |
| 90 | 75 |
| 95 | 90 |
| 100 | 100 |

In an embodiment, the computing device 30 is adapted to generate status data and degree of opening data which are, respectively, indicative of the determined status and degree of opening of the valve 24. In another embodiment, the computing device 30 is adapted to generate a flow of water data and a volume of water delivered data which are indicative of, respectively, the determined flow of water and the determined volume of water being delivered. The computing device 30 can be adapted to determine the volume of water delivered by the liquid supply line 20 by evaluating the integral of the flow of water as a function of time from the first position $\theta_1$ to the second position $\theta_2$, for instance.

Moreover, the flow of water may not be in steady state during the whole process of the actuation of the valve 24 from the first position $\theta_1$ to the second position $\theta_2$. Depending on a speed of actuation of the valve 24, a bias can be introduced when evaluating the flow of water at each intermediary positions between the first position $\theta_1$ and the second position $\theta_2$. When the speed of actuation of the valve 24 is below a speed threshold, the flow of water is considered to be in steady state from the first position $\theta_1$ to the second position $\theta_2$ and no bias is introduced. However, when a speed of actuation of the valve 24 is higher than the speed threshold, the flow of water may not vary linearly between the first position $\theta_1$ and the second position $\theta_2$ of the valve 24. Thus, causing the computing device 30 to err in determining the flow of water and the total volume of water delivered. Accordingly, the calibration flow data are adapted to compensate for such transient effects (i.e., the biases) caused during actuation of the valve 24 by factoring in the speed of actuation of the valve 24 in the calibration flow data. This can thus allow a worker to move the actuator 26 upon any speed of actuation and still obtain a suitable result of the flow of water and the volume of water delivered.

It is contemplated that the system 28 is to be retrofitted to already existing concrete mixers 10. Therefore, the flow of water data generated in accordance with the present system and method may be formatted to fit flow of water data generated by flow meters of the prior art. For instance, the flow of water data may be characterized by a signal having pulses at a predetermined frequency so that when the flow of water changes, the frequency of the signal of the flow of water data changes accordingly. For example, the predetermined frequency is ten pulses per second when the flow of water is maximum and the predetermined frequency is zero pulse per second when the flow of water is null.

As can be readily understood, the status of the valve can effectively be associated to the flow of water when there is water provided in the liquid supply line 20. Indeed, if the liquid reservoir 22 empties, it is important that the system 28 factors in the fact that even though the status of the valve 24 might be at the fully open position $\theta_{max}$, this not necessarily implies that water is being delivered. Accordingly, it is useful to regulate and measure pressure of water at a position upstream from the valve 24 in the liquid supply line 20.

Figure 3:
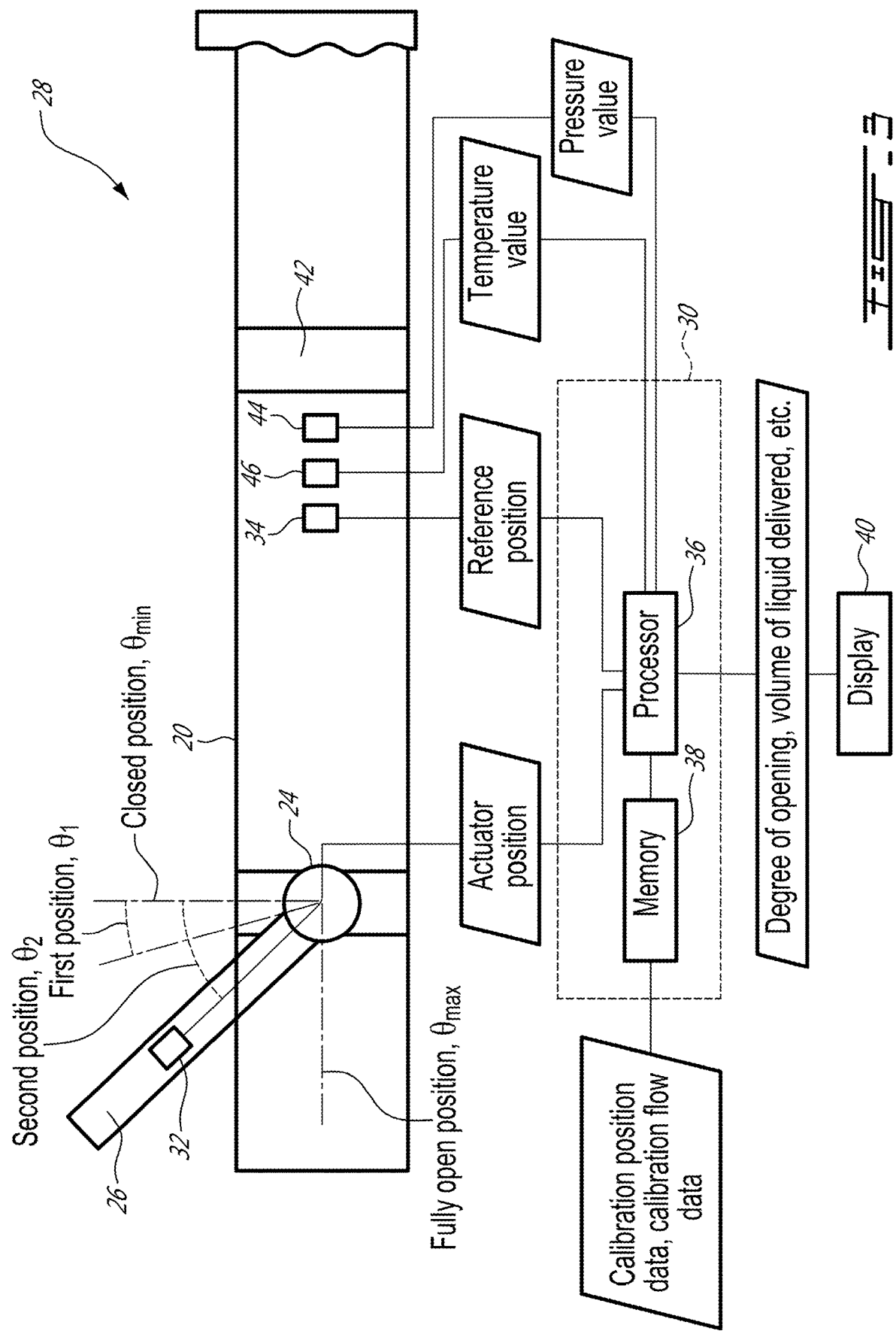
FIG. 3 is a schematic view of a second example of a device for determining a status of a valve.

FIG. 3 shows a schematic view of a second example of a system 28 for determining a status of the valve 24 mounted to the liquid supply line 20 which can compensate for a variation of pressure of the water being delivered from the liquid reservoir 22. In this example, the system 28 further comprises a pressure regulator 42 and a pressure sensor 44. In this example, the pressure regulator 42 is mounted in the liquid supply line 20 at a position upstream from the valve 24. The pressure regulator 42 contributes to regulate the pressure of the water which can help determining the flow of liquid being delivered from the liquid supply line 20. It is contemplated that the pressure regulator 42 can increase the precision in the determination of the flow of water. In the example embodiment of FIG. 3, the pressure sensor 44 is mounted to the liquid supply line 20 to measure a pressure value of the flow of water thereinside. The pressure sensor 44 can be any suitable type of pressure sensor which can provide pressure measurements of the flow. In one embodiment, the pressure sensor 44 is positioned within the liquid supply line 20, in direct contact with water. In another embodiment, the pressure sensor 44 such as a strain gauge (e.g., measuring the expansion of the diameter of the liquid supply line) is mounted on the exterior of the liquid supply line 20, not in contact with water. The pressure value measured by the pressure sensor 44 is received by the computing device 30 which can use the pressure value along with calibration pressure data to suitably determine the flow of the water. Accordingly, the calibration data includes also calibration pressure data which can provide the flow of water based on the status of the valve 24 and on the pressure value of the flow inside the liquid supply line 20. In other words, if the pressure value measured is 1 atm, then there is no flow of water, hence, the flow of fluid is null even if the valve 24 is considered to be opened.

The second example of the system 28 further comprises a temperature sensor 46 mounted to the concrete mixer 10 for measuring a temperature value. The computing device 30 is adapted to receive the temperature value and adapted to generate an alert signal via the display 40. This can be useful if the temperature value is below a threshold such as a temperature indicative of the freezing point of water (i.e. 0° C.), and the alert signal can be used to trigger an alarm or a valve heating device such as a heating wire for instance.

It will be understood that in the figures, the expressions first and second positions have associated arbitrarily to two positions of the valve in the general scope of providing an example of a possible actuation of the valve from one position to the other. It will be understood that the expressions first and second positions, $\theta_1$ and $\theta_2$, are not to be interpreted limitatively as corresponding to any specific combination of valve positions. For instance, the first position can be a fully open position or a partially open position, the second position can be a fully closed position or a partially closed position, or vice-versa, i.e. first position can be a fully closed position or a partially closed position, the second position can be a fully open position or a partially open position. It will be understood given the above that actuating the valve from the first position to the second position can either contribute to close or open the valve, depending of which valve states the first and second positions are respectively associated to in a given embodiment or example.

Figure 4:
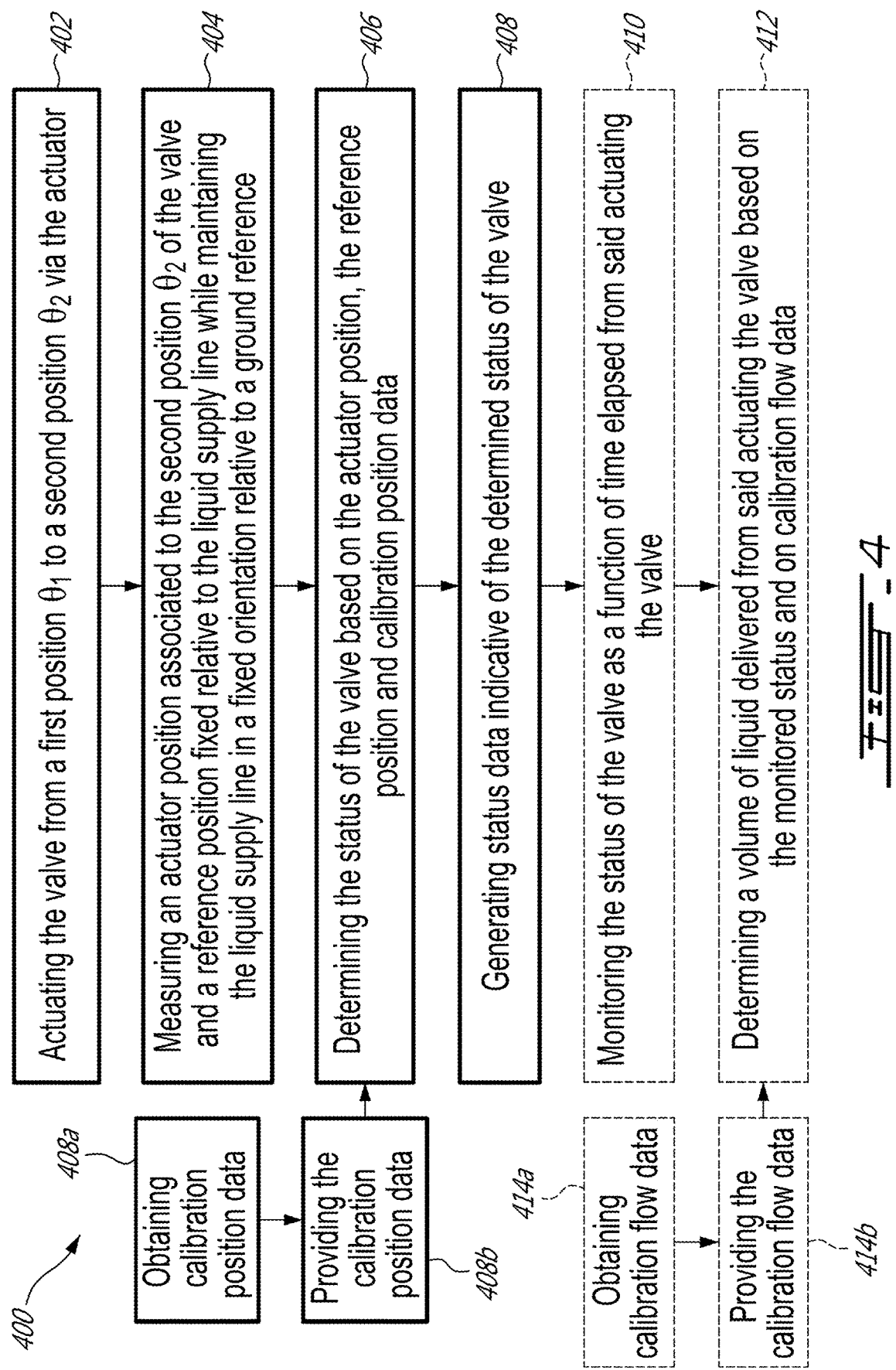
FIG. 4 is a flowchart of an example of a method for determining a status of a valve.

FIG. 4 is a flowchart of an exemplary method 400 for determining a status of the valve 24. The method may comprise the step 401 of actuating the valve 24 from a first position $\theta_1$ to a second position $\theta_2$ via the actuator 26; a step 404 of measuring an actuator position associated to the second position $\theta_2$ of the valve 24 and a reference position fixed relative to the liquid supply line 20 while maintaining the liquid supply line 20 in a fixed orientation relative to a ground reference; a step 406 of determining, using the computing device 30, the status of the valve 24 based on the actuator position, the reference position and calibration position data; a step 408 of generating status data indicative of the determined status of the valve 24; a step 410 of monitoring the status of the valve 24 as a function of time elapsed from said actuating the valve 24; and a step 412 of determining a volume of liquid delivered from said actuating the valve 24 based on the monitored status and on calibration flow data. In this embodiment, it is contemplated that steps 408a and 408b of obtaining and providing the calibration position data can be associated to, respectively, measuring the calibration position data and storing the calibration position data on the memory 38 of the computing device 30. In this embodiment also, it is contemplated that steps 414a and 414b of obtaining and providing the calibration flow data can be associated to, respectively, measuring the calibration flow data and storing the calibration flow data on the memory 38 of the computing device 30.

FIG. 5 shows a schematic view of a third example of a system 28 for determining a status of the valve 24. The system 28 includes the actuator accelerometer 32 mounted on the actuator 26 and the reference accelerometer 34 mounted on the liquid supply line 20. The system 28 also includes a processing unit 46 which receives a magnetic switch 48, a three-color light-emitting diode 50 (LED), the reference accelerometer 34 and a first electrical wire 52 connected to the actuator accelerometer 32. The processing unit 46 is hermetically isolated from the exterior so that it is exempt from contacting water and other undesirable substances. The processing unit 46 can then be connected to the computing device 30 via a second electrical wire 54. Noise reducing devices can be connected to the accelerometers 32, 34 for reducing the noise associated with the measurements. Such noise reducing device can be provided in the form of condensers connected directly thereto.

In this example, the processing unit 46 has a configuration mode which allows for storing therein the closed position $\theta_{min}$ and the open position $\theta_{max}$. To enable the configuration mode, a user can provide a magnet to the magnetic switch 48, which causes the three-color LED 50 to flash red for five seconds. While the three-color LED 50 flashes red, the user moves the actuator 26 in the closed position θmin. When the three-color LED 50 stops flashing red, the processing unit 46 stores the position of the actuator 26 to be the closed position $\theta_{min}$. Then, the user places the magnet on the magnetic switch 48 again which causes the three-color LED 50 to flash green for five seconds. While the three-color LED 50 flashes green, the user moves the actuator 26 in the fully open position $\theta_{max}$. When the three-color LED 50 stops flashing green, the processing unit 46 stores the position of the actuator 26 to be the fully open position $\theta_{max}$. Once these steps are completed, the three-color LED 50 turn to blue which indicates that the configuration mode is over and that the processing unit 46 in a normal mode, ready for actuation of the valve 24. This sequence of steps is an example of how the calibration position data can be taught to the system 28 in a simple manner, however it is contemplated that other suitable sequences of steps may achieve the same results.

As can be understood, the examples described above and illustrated are intended to be exemplary only. The scope is indicated by the appended claims.

What is claimed is:

1. A system for determining a status of a valve being mounted in a liquid supply line, the valve being actuatable by an actuator from a first position to a second position to control the delivery of liquid, the system comprising:
   an actuator accelerometer mounted to the actuator and being adapted to measure an actuator position associated to the actuation of the valve, and to generate an actuator signal indicative thereof;
   a reference accelerometer positioned in a fixed position relative to the liquid supply line and being adapted to measure a reference position fixed relative to the liquid supply line, and to generate a reference signal indicative thereof;
   and a computing device operatively connected to the actuator and reference accelerometers for receiving the actuator signal and the reference signal, the computing device being adapted to:
   determine the status of the valve based on the actuator signal and the reference signal, wherein the actuator signal and the reference signal are obtained simultaneously, wherein the computing device is further adapted to calculate a total volume of liquid delivered through the liquid supply line based on the determined status of the valve as a function of time elapsed and on calibration flow data.

2. The system of claim 1, wherein the determined status is one of fully closed, fully opened, and opened at a degree of opening.

3. The system of claim 1 further comprising a memory accessible by the computing device that contains the calibration flow data.

4. The system of claim 3 further comprising a display for displaying the determined volume of liquid delivered from the liquid supply line.

5. The system of claim 3 wherein the computing device is further adapted to generate an alert signal when a threshold value of the determined volume of liquid is reached.

6. The system of claim 3, further comprising a pressure sensor mounted inside the liquid supply line at a position upstream from the valve and being operatively connected to the computing device, the pressure sensor being adapted to measure a pressure value indicative of pressure thereinside, wherein the determined volume of liquid is further based on the measured pressure value.

7. The system of claim 1, further comprising a pressure regulator mounted inside the liquid supply line at a position upstream from the valve and being adapted to regulate the pressure inside the liquid supply line.

8. The system of claim 1, further comprising a temperature sensor mounted to the liquid supply line and being operatively connected to the computing device, the temperature sensor being adapted to measure a temperature value indicative of temperature of the liquid supply line.

9. The system of claim 8, wherein the computing device being further adapted to generate an alert signal when the measured temperature value is below a threshold temperature value of the liquid.

10. The system of claim 9, further comprising a heating device mounted to the valve and being triggered into operation by the alert signal.

11. The system of claim 1, wherein the liquid supply line is a liquid supply line of a concrete mixer truck, the concrete mixer truck having a body and a drum rotatably mounted to the body for rotation relative thereto about an axis which is in a fixed position relative to the body, a liquid reservoir made integral to the body of the concrete mixer truck, the liquid supply line being connected to the liquid reservoir of the concrete mixer truck and leading to the drum.

12. A method for determining a status of a valve mounted in a liquid supply line and controllable via an actuator, the method comprising the steps of:
   actuating the valve from a first position to a second position via the actuator;
   simultaneously measuring both an actuator signal associated to the actuation of the valve and a reference signal associated to a reference position fixed relative to the liquid supply line;
   determining the status of the valve based on the actuator signal and the reference signal; and
   determining a volume of liquid delivered through the liquid line based on the determined status of the valve as a function of time elapsed and on calibration flow data.

13. The method of claim 12, wherein the determined status is one of fully closed, fully opened, and opened at a degree of opening.

14. The method of claim 12, further comprising displaying the determined volume of liquid delivered from the liquid supply line.

15. The method of claim 12, further comprising closing the valve when a threshold value of the determined volume of liquid is reached.

16. The method of claim 12, further comprising measuring a pressure value indicative of pressure inside the liquid supply line at a position upstream from the valve, wherein said determining a volume of liquid is further based on the measured pressure value.

17. The method of claim 12, further comprising regulating pressure inside the liquid supply line at a position upstream from the valve.

18. The method of claim 12, further comprising measuring a temperature value indicative of temperature outside the liquid supply line and in close proximity therewith.

19. The method of claim 18, further comprising displaying an alert when the temperature value is below a threshold temperature value.

20. The method of claim 12, wherein said determining the status of the valve is further based on calibration position data, the method further comprising producing said calibration position data, including:
   positioning the actuator at a plurality of positions between a fully closed and a fully opened positions;
   for each of the plurality of positions of the actuator, comparing the actuator signal relative to the reference signal; and
   producing the calibration position data based on the plurality of comparisons.

21. The method of claim 12, further comprising producing calibration flow data, including:
   positioning the actuator at a plurality of positions between a fully opened and a fully closed positions thus allowing the liquid to flow from the liquid supply line at a corresponding plurality of flow rates;
   for each of the plurality of positions of the actuator, measuring a flow rate value of the liquid through the valve of the liquid supply line;
   associating each measured flow rates of the liquid with a corresponding one of the plurality of positions of the actuator; and
   producing the calibration flow data based on said associations.

* * * * *